United States Patent
Teramachi

(10) Patent No.: US 6,287,005 B1
(45) Date of Patent: Sep. 11, 2001

(54) ROLLER GUIDING APPARATUS

(75) Inventor: Hiroshi Teramachi, 3-12-30-301, Kamiosaki, Shinagawa-ku, Tokyo (JP)

(73) Assignee: Hiroshi Teramachi (JP)

( * ) Notice: Subject to any disclaimer, the term of this patent is extended or adjusted under 35 U.S.C. 154(b) by 0 days.

(21) Appl. No.: 09/448,126

(22) Filed: Nov. 24, 1999

(30) Foreign Application Priority Data

Nov. 25, 1998 (JP) .................................... 10-334690
Apr. 30, 1999 (JP) .................................... 11-161445

(51) Int. Cl.⁷ ....................................... F16C 31/06

(52) U.S. Cl. ................................. 384/44; 384/51

(58) Field of Search ................. 384/44, 50, 55, 384/56

(56) References Cited

U.S. PATENT DOCUMENTS 4,702,622 * 10/1987 Teramachi ............................. 384/44
5,005,988 * 4/1991 Lyon ...................................... 384/44
5,836,701 * 11/1998 Vranish ............................. 384/44 X

* cited by examiner

Primary Examiner—Thomas R. Hannon
(74) Attorney, Agent, or Firm—Brinks Hofer Gilson & Lione

(57) ABSTRACT

A roller guiding apparatus for use in linear guiding portions of a variety of kinds of industrial machines such as machine tools and the like is provided for guiding rollers which rollingly travel along a pair of opposed roller-rolling surfaces formed on a traveling rail and a movable body so as to move the movable body along the traveling rail. The apparatus employs barrel-shaped rollers which are suitable for supporting heavy loads and have excellent self-aligning ability and vibration-damping capability. To this end, the barrel-shaped rollers (4) each have a pair of arc-shaped portions (4a, 4b) which gradually decrease in their diameter from a center thereof toward opposite ends thereof. The opposed roller-rolling surfaces (5, 6) are configured such that those regions thereof which correspond to the opposite side arc-shaped portions (4a, 4b) of each roller (4) are composed of arc surfaces (5b, 5b; 6b, 6b) which have a radius of curvature slightly greater than that of the opposite side arc-shaped portions (4a, 4b) of each roller (4) so as to cause differential slips when the rollers (4) are traveling while contacting the opposed roller-rolling surfaces.

9 Claims, 7 Drawing Sheets

(A)

(B)

(A)

(B)

(C)

(A)

(B)

(C)

(D)

(E)

(A)

(B)

(C)

ROLLER GUIDING APPARATUS

BACKGROUND OF THE INVENTION

The present invention relates to a roller guiding apparatus for use in linear guides and the like of various industrial machines such as machine tools and so on.

In order to cope with this problem, in case of a rolling guide apparatus employing balls, the ability of attenuating or damping vibrations during the sliding and rolling movement of the balls is enhanced by positively utilizing differential slips of the balls caused by differences in the ball diameter in the center and the periphery of their contacting portions (see Japanese Patent Application Laid-Open No. H07-35136 for example).

In the case of balls used as rolling members, however, a rolling guide apparatus is sometimes liable to have an insufficient load-bearing capacity when applied to heavy machine tools, large-sized machines and so on.

On the other hand, rollers may be used in place of balls, and in this case, rollers of a cylindrical shape can provide an increased load-bearing capacity but do not have self-alignment and differential slips like balls, so no satisfactory vibration-damping capability can be expected.

SUMMARY OF THE INVENTION

In view of the above, the present invention is intended to obviate the above-described problems of the prior art and has for its object to provide a novel and improved roller guiding apparatus of the character described above which employs rollers having high rigidity as compared with balls and which has excellent self-alignment and vibration-damping capability as well.

In order to achieve the above object, according to the present invention, there is provided a roller guiding apparatus comprising:

an elongated traveling rail having a roller-rolling surface formed thereon;
a movable body having a roller-rolling surface formed in opposition to the roller-rolling surface of said traveling rail; and
a multitude of rollers interposed between the opposed roller-rolling surfaces of said traveling rail and said movable body:
wherein said rollers are each formed with a pair of arc-shaped portions having a diameter gradually decreasing from a central portion thereof toward opposite ends thereof, and
wherein each of said roller-rolling surfaces has a pair of first regions corresponding to said arc-shaped portions of each of said rollers, said first regions being each formed into an arc surface having a radius of curvature slightly greater than that of a corresponding arc surface of each roller such that each roller can be in contact at its opposite side arc surfaces with the corresponding arc surfaces of said opposed roller-rolling surfaces to thereby cause a differential slip therebetween.

With this arrangement, using as rolling members the rollers each having the opposite side arc-shaped portions provides for an increased length of contact between each roller and the opposed roller-rolling surfaces in comparison with balls, so that the load-carrying capacity of the apparatus for supporting a load applied thereto can be increased and excellent self-alignment can be obtained as well.

Moreover, during rolling, the rollers are in contact at their opposite side arc-shaped portions with the opposite side arc surfaces of said opposed roller-rolling surfaces to thereby cause differential slips therebetween, thus increasing the vibration-amping capability of the apparatus due to the resultant sliding frictional resistance.

in a preferred form of the invention, the central portion of each of said rollers comprises a central cylindrical portion of a cylindrical configuration. With this construction, it is easy to fabricate the rollers and perform measurements thereof as well.

In addition, when applied by a light load, the rollers being in contact at their central cylindrical portion with the opposed roller-rolling surfaces can travel in a smooth and light manner without causing differential slip, whereas when applied by a heavy load such as during a cutting operation and the like, the rollers are placed in contact at their opposite side arc-shaped portions with the opposite side arc surfaces of the roller-rolling surfaces, so that there arise differential slips therebetween, thus enhancing the vibration-damping capability of the apparatus.

In another preferred form of the invention, each of said roller-rolling surfaces has a second region corresponding to said central cylindrical portion of each roller, said second region comprising an arc-shaped surface contiguous to said opposite side arc surfaces of each roller-rolling surface. With this construction, when acted by a light load, the opposite ends of said central cylindrical portion of each roller are placed into point contact with the arc-shaped surface of the second region, thus ensuring smoother and lighter movements of the rollers.

Preferably, the second region of each of said roller-rolling surfaces comprises a flat linear portion. With this construction, the area of contact between each roller and the roller-rolling surfaces becomes great, increasing the load-bearing capacity of the apparatus.

On the other hand, the central portion of each of said rollers may comprise a central arc-shaped portion. This serves to enhance the self-alignment of the rollers.

In a further preferred form of the invention, each of said roller-rolling surfaces has a second region which corresponds to the central arc-shaped portion of each roller and which has a radius of curvature slightly greater than that of the central arc-shaped portion of each roller. This construction serves to further enhance the self-alignment of the rollers.

In a still further preferred form of the invention, each of said roller-rolling surfaces has a second region which corresponds to the central arc-shaped portion of each roller and which has a radius of curvature substantially equal to that of the central arc-shaped portion of each roller. With this construction, the load-bearing capacity and the vibration-damping capability of the apparatus can be increased.

Preferably, each of said opposed roller-rolling surfaces consists of a pair of opposite side arc surfaces so that each roller is in contact at its opposite side arc-shaped portions with the opposite side arc surfaces of the opposed roller-rolling surfaces at four points. With this construction, each roller contacts the opposite side arc surfaces of each roller-rolling surface at two points, thus increasing the load-bearing capacity of the apparatus in comparison with the case in which each roller contacts each roller-rolling surface at one point.

Also, in this case, the points of contact of the opposed roller-rolling surfaces with respect to each roller when lightly loaded are bottoms of the opposite side arc surfaces of the roller-rolling surfaces, whereas when heavily loaded, the points or portions of contact expand from the respective bottoms of the two arc surfaces of the roller-rolling surfaces toward the opposite sides thereof, thereby increasing the vibration-damping capability.

Preferably, said rollers on said traveling rail at an upper and opposite sides thereof are held in place and connected with each other by means of corresponding roller connectors, respectively. With this construction, during rolling movements of the rollers, the central axis of each roller can be precisely guided in a direction perpendicular to the traveling direction of the movable body, i.e., perpendicular to the longitudinal direction of the traveling rail.

The above and other objects, features and advantages of the present invention will become more readily apparent from the following detailed description of preferred embodiments of the invention when taken in conjunction with the accompanying drawings.

DESCRIPTION OF THE PREFERRED EMBODIMENTS

Figure 1:
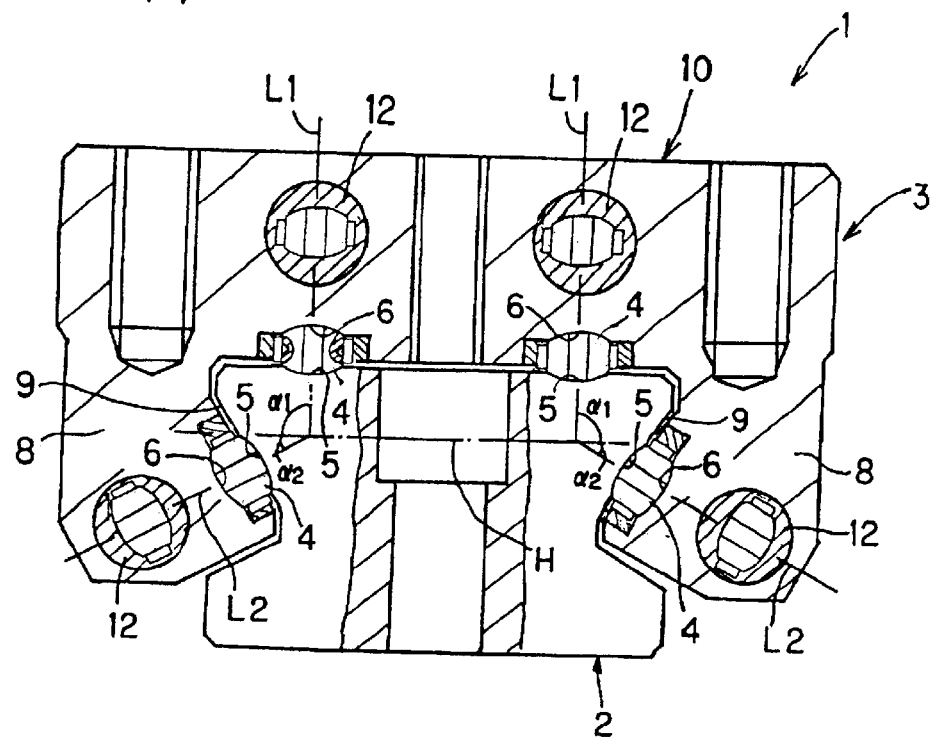
FIG. 1(A) is a vertically sectioned front elevational view of a roller guiding apparatus in accordance with a first embodiment of the present invention.
FIG. 1(B) is a cross-sectional view of a circulating passage for a train of barrel-shaped rollers on an upper side of a traveling rail.
Figure 1:
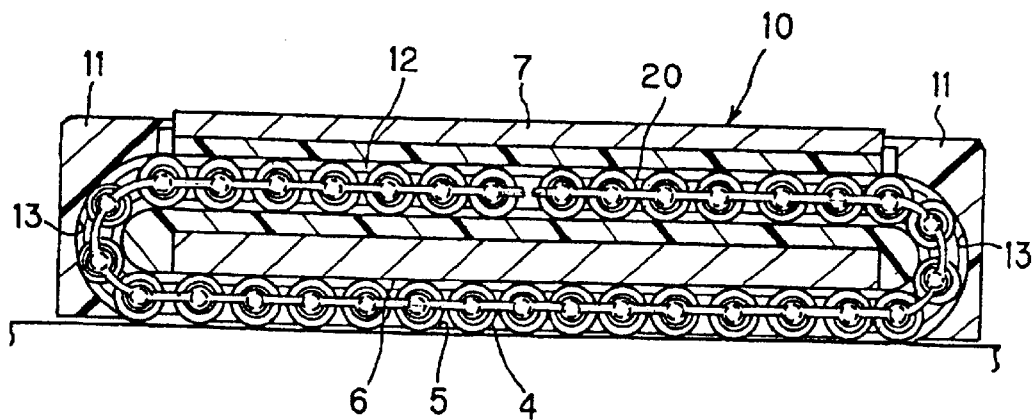
Figure 2:
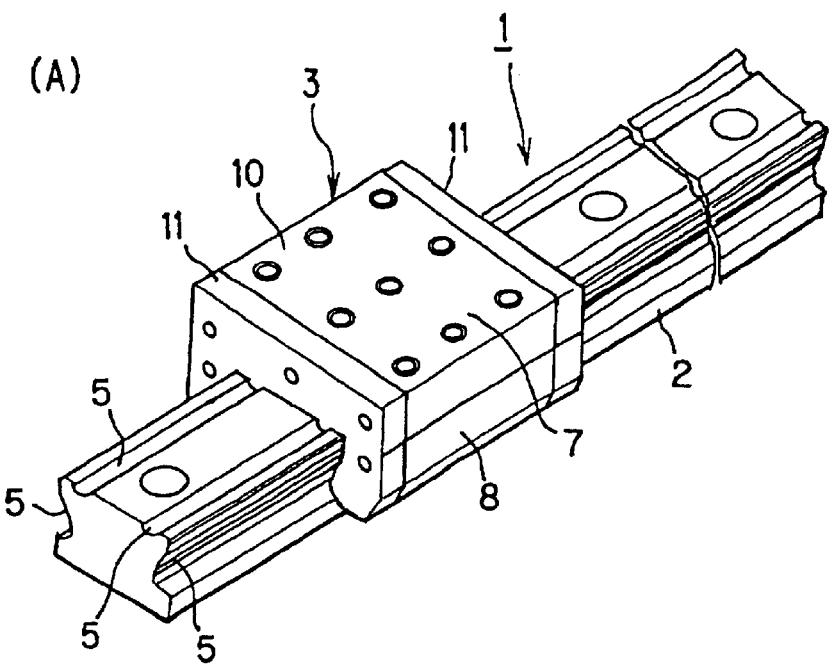
FIG. 2(A) is a schematic perspective view of the apparatus of FIG. 1(A)
FIG. 2(B) is a plan view of the apparatus of FIG. 2(A)
FIG. 2(C) is a side elevational view of the apparatus of FIG. 2(A)
Figure 2:
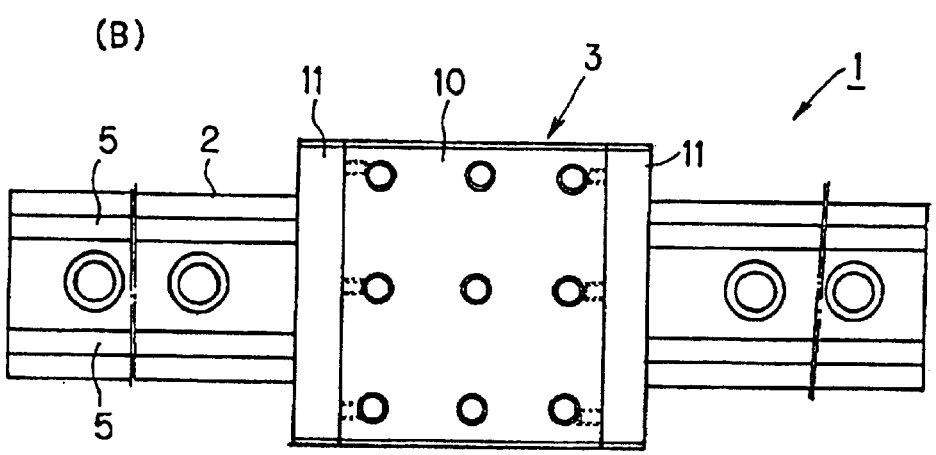
Figure 2:
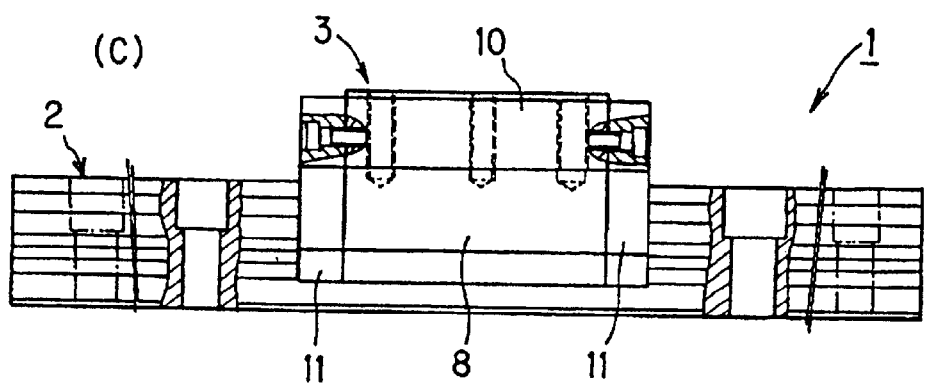
Figure 3:
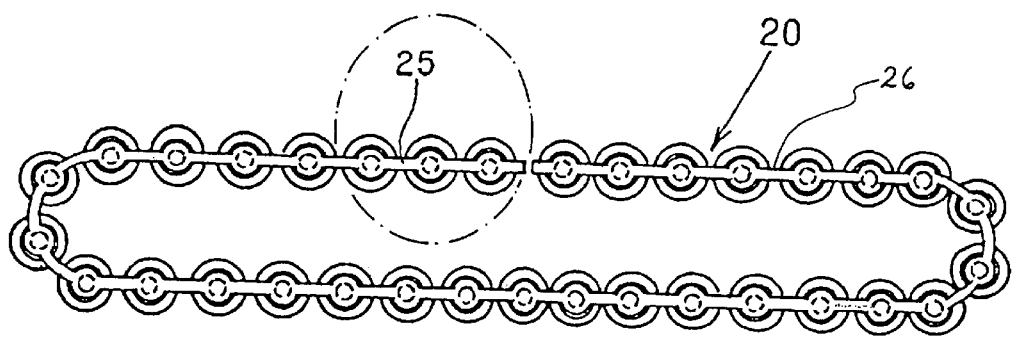
FIG. 3(A) is a side elevational view of a roller connector incorporated in the apparatus of FIG. 1(A)
FIG. 3(B) is a partially broken top view of a roller.
FIG. 3(C) is an explanatory view showing the condition of engagement between the roller and the roller connector of FIG. 3(A)
FIG. 3(D) is a view showing an end portion of the roller connector of FIG. 3(A)
FIG. 3(E) is an enlarged view showing the area of FIG. 3(A) circled by a broken line labeled "(E)"
Figure 3:
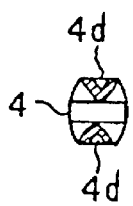
Figure 3:
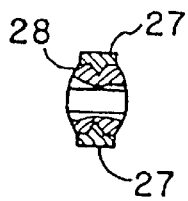
Figure 3:
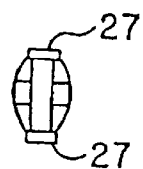
Figure 3:
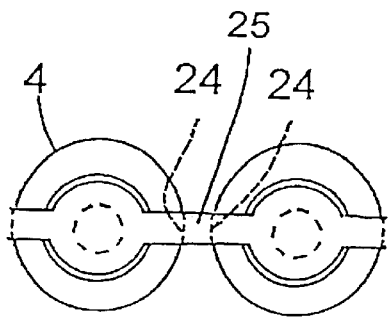
Figure 4:
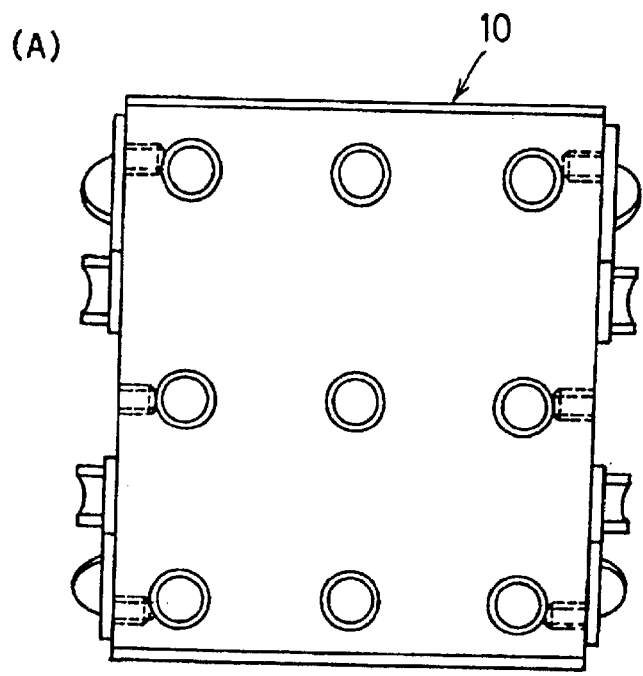
FIG. 4(A) is a top view of a movable body block of the apparatus of FIG. 1(A)
FIG. 4(B) is a front elevational view of the movable body block of FIG. 4(A)
FIG. 4(C) is a cross-sectional view taken along line C—C in FIG. 4(B)
Figure 4:
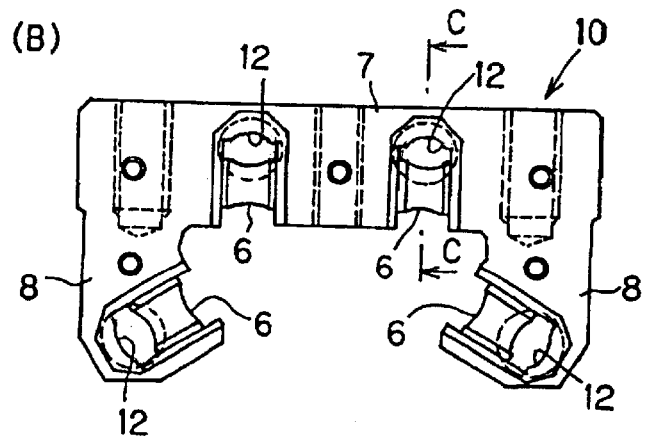
Figure 4:
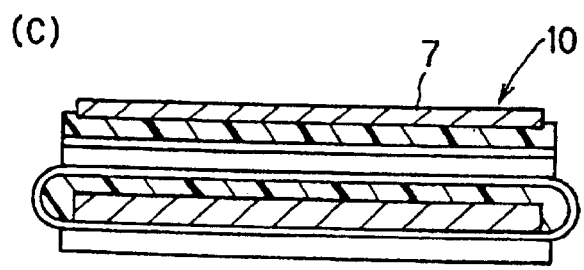
Figure 5:
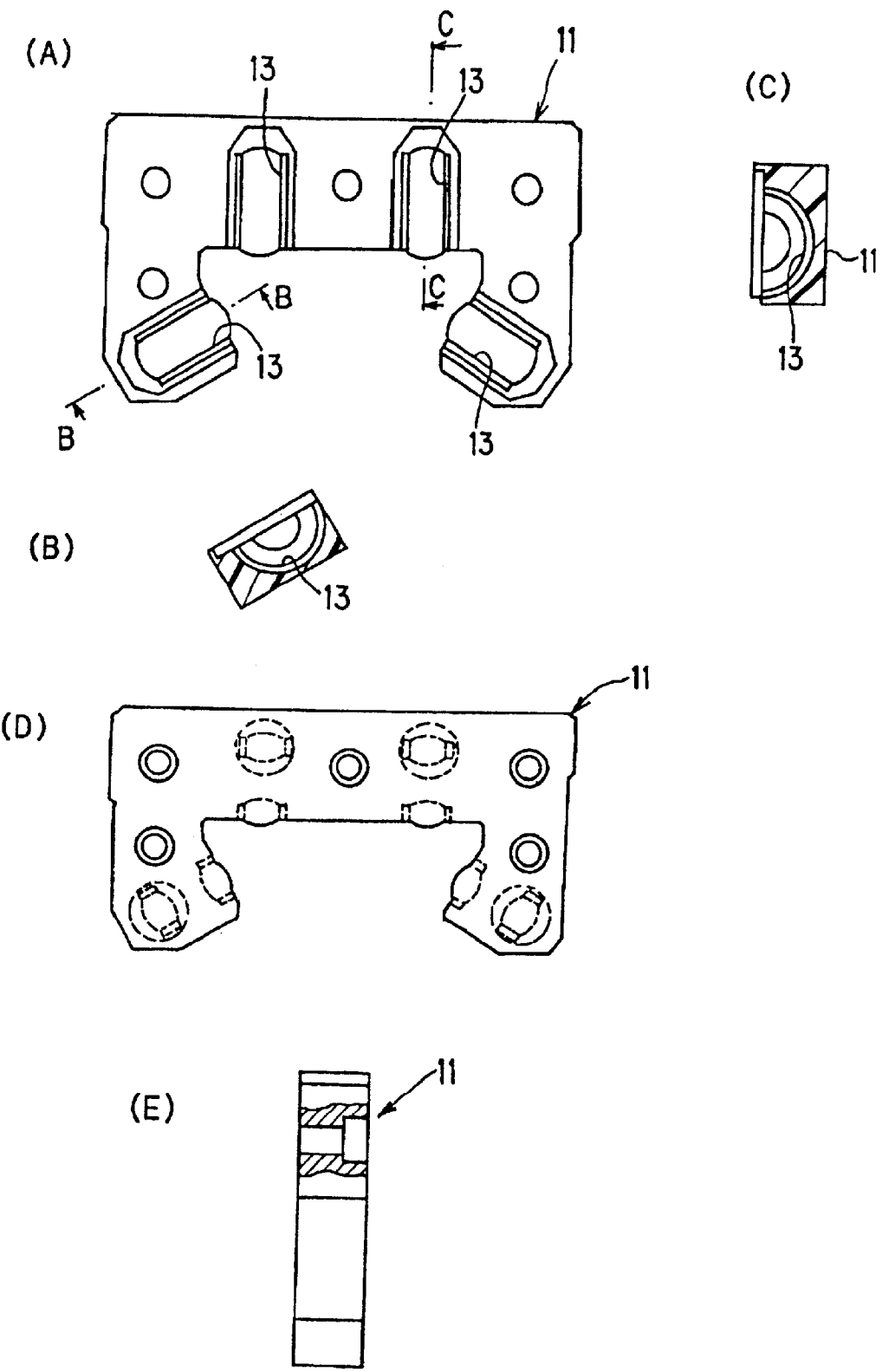
FIG. 5(A) is a rear view of a side cover of the apparatus of FIG. 1(A)
FIG. 5(B) is a cross section taken along line B—B of FIG. 5(A)
FIG. 5(C) is a cross section taken along line C—C of FIG. 5(A)
FIG. 5(D) is a front elevational view of the side cover.
FIG. 5(E) is a partially broken side view of FIG. 5(D)
Figure 6:
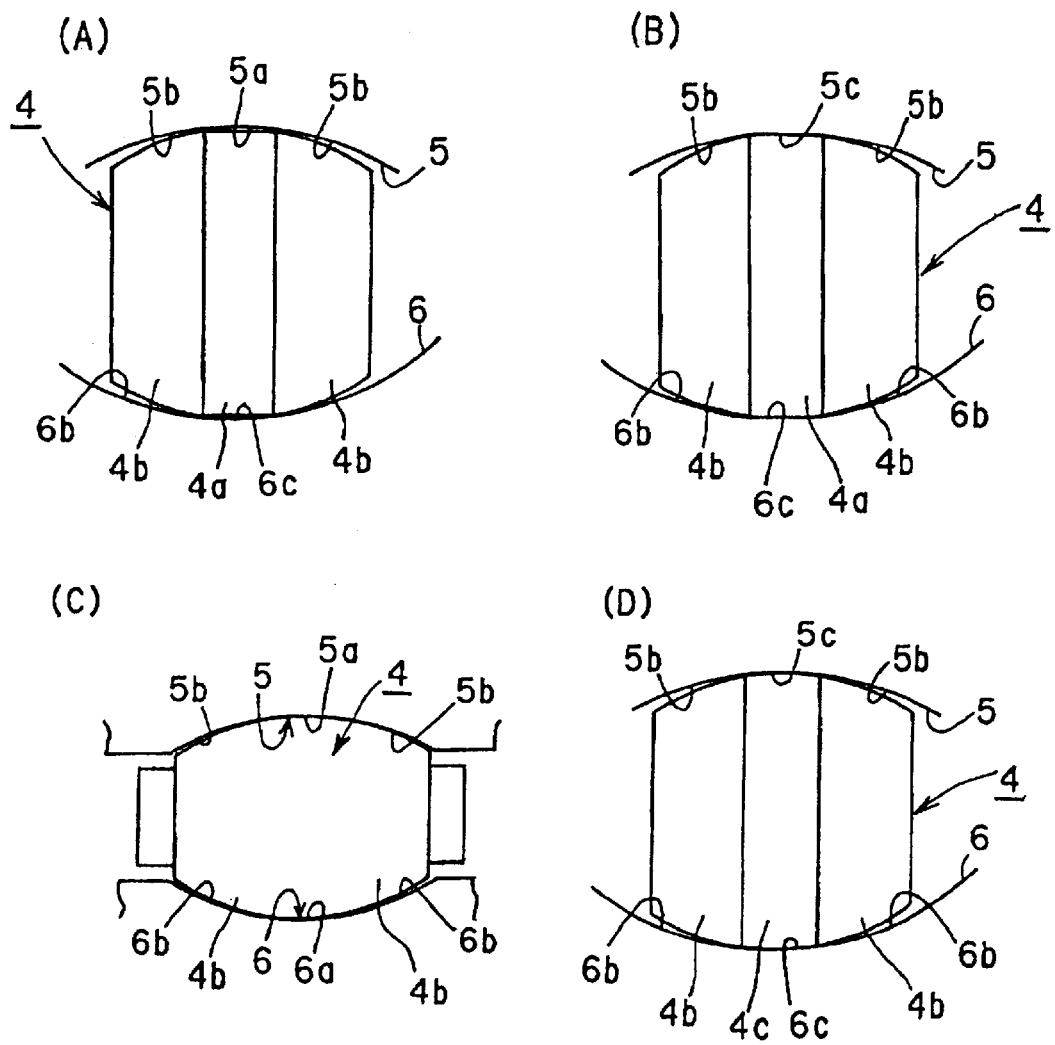
FIG. 6(A) is a cross-sectional view showing the condition of contact between a roller and a roller-rolling surface of the apparatus of FIG. 1(A)
FIG. 6(B) is a cross-sectional view showing the condition of contact between a roller and a roller-rolling surface in accordance with a second embodiment of the present invention.
FIG. 6(C) is a cross-sectional view showing the condition of contact between a roller and a roller-rolling surface in accordance with a third embodiment of the present invention.
FIG. 6(D) is a cross-sectional view showing the condition of contact between a roller and a roller-rolling surface in accordance with a fourth embodiment of the present invention.

Now, preferred embodiments of the present invention will be described below in detail while referring to the accompanying drawings.

Referring to the drawings and first to FIGS. 1(A) through 6(A), there is illustrated a roller guiding apparatus in accordance with a first embodiment of the present invention. In these figures, the roller guiding apparatus as a whole is generally designated at a reference numeral 1 and includes an elongated traveling rail 2 having a plurality of roller-rolling surfaces 5 formed thereon, a movable body 3 having a plurality of roller-rolling surfaces 6 formed thereon in confrontation with the corresponding roller-rolling surfaces 5 of the traveling rail 2, respectively, and a multitude of rollers 4 disposed between the corresponding roller-rolling surfaces 5, 6 of the rail 2 and the movable body 3. The rollers 4 are formed into a plurality of trains of rollers, each train of rollers being held in position by means of a roller connector 20.

As shown in FIG. 3(A), each of the roller connectors 20 includes a belt-shaped body or member 26 having a multitude of reception holes 24 for holding the rollers 4 formed along the length thereof at a predetermined pitch with a spacer portion 25 interposed between adjacent holes, and a pair of end-face holding plates 27 provided on the widthwise opposite side edges of each reception hole 24 in the belt member 26. An engagement segment may be provided at an edge of each reception hole 24 for engaging and holding the outer peripheral surface of each roller 4. The end-face holding plates 27 are in contact with the opposite end faces of each roller 4 to thereby stably hold an axis of each roller 4 in place in a direction orthogonal to the traveling direction of the rollers 4. The end-face holding plates 27 are provided at their center with engagement projections 28 which are in fitting engagement with center holes 4a formed on the opposite end faces of each roller 4 for rotational sliding movement. The end-face holding plates 27 of each roller connector 20 are guided by an inner wall of a corresponding roller-traveling groove 6. Each of the center holes 4a may be a cone-shaped hole of a triangular cross section.

The traveling rail 2 has a flat or planar top surface on which two roller-rolling surfaces 5, 5 are formed on the opposite sides of a center thereof at locations equally spaced in widthwise or transverse directions therefrom. The traveling rail 2 is also provided on the opposite sides thereof with a pair of inclined surfaces 9, 9 which extend diagonally downward from the opposite side upper ends thereof to the center thereof at an acute angle. The inclined surfaces 9, 9 are each provided with one of the aforementioned barrel-shaped roller-rolling surfaces 5. A plurality of vertically extending bolt holes are formed through the traveling rail 2 in the vertical direction.

The movable body 3 comprises a block member 10 having a block body proper 7 and pair of legs 8, 8 extending downward from the transversely opposite ends of the block body proper 7, and a pair of side covers 11, 11 fitted to the axial or longitudinal ends of the block member 10. The block body proper 7 and the opposite legs 8, 8 are respectively provided with roller return passages 12 extending in parallel with the roller-rolling surfaces 6 formed on the inner surfaces thereof, the roller-rolling surfaces 6 being connected with the corresponding roller return passages 12 at their opposite ends through corresponding U-shaped direction-changing passages 13 formed in the opposite side covers 11 to provide circulation paths for circulating the barrel-shaped rollers 4. The roller-rolling surfaces 6 for bearing loads are made of metal, but the remaining portions of the circulation paths are made of resin and integrally formed with the metal block. The roller-rolling surfaces 6 are formed on the bottoms of traveling grooves which are rectangular in cross section and which have inner side walls acting as guide walls for guiding the opposite end faces of the barrel-shaped rollers 4 through the intermediary of the end-face holding plates 27.

Figure 8:
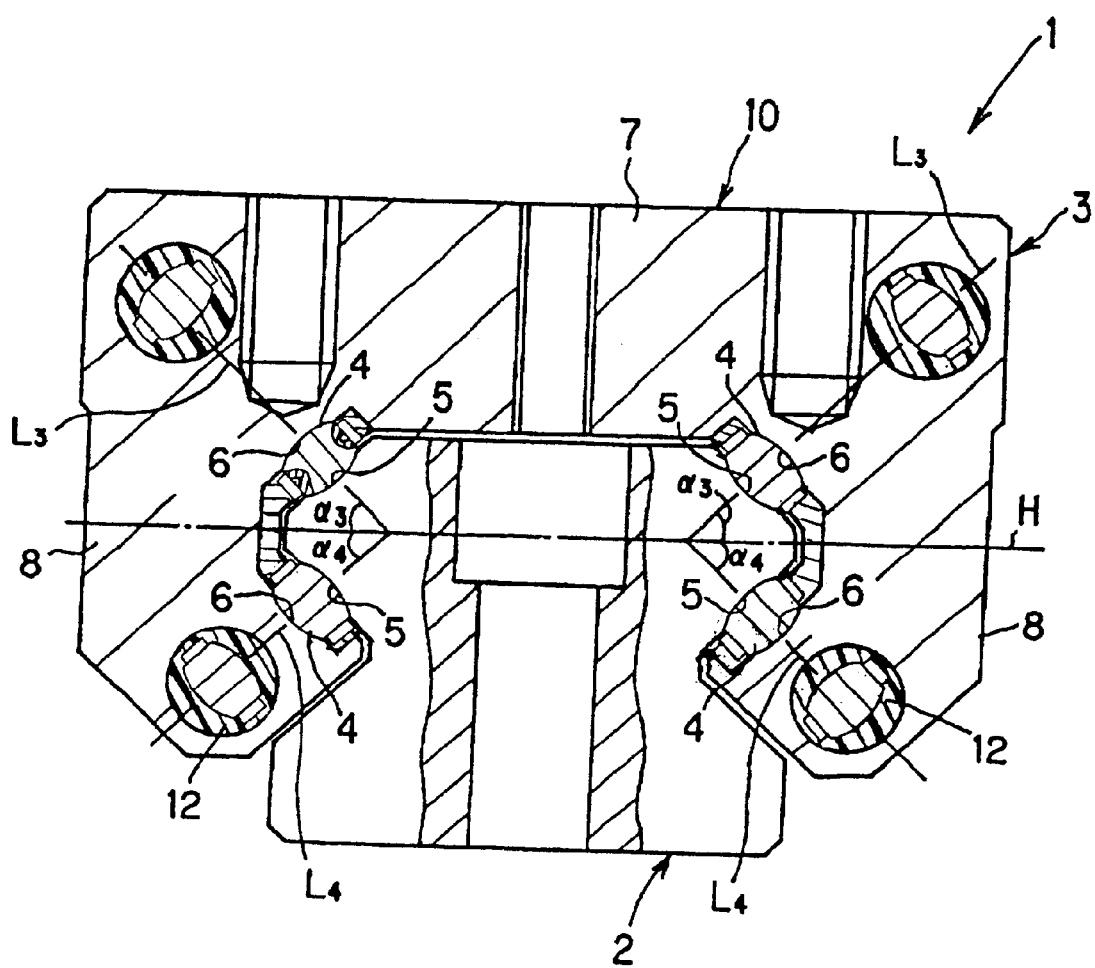
FIG. 8 is a view similar to FIG. 1(A), but showing a modification with another contact angle of the rollers in the apparatus of FIG. 1(A).

Here, it is to be noted that the angle of contact $\alpha 1$ of the rollers 4 on the upper surface of the traveling rail 2 is set to be 90 degrees, and that the angle of contact $\alpha 2$ of the rollers 4 on the opposite side surfaces of the traveling rail 2 is set to be 30 degrees. These angles of contact of the rollers 4 can be arbitrarily selected in accordance with loading conditions. For example, with a sample shown in FIG. 8, the angle of contact $\alpha 3$ of the rollers 4 on the upper surface of the rail 2 is set to be 45 degrees, and the angle of contact $\alpha 4$ on the opposite side surfaces of the rail 2 is also set to be 45 degrees. In this connection, note that these angles of contact $\alpha 1$–$\alpha 4$ are respectively defined as angles which are formed by a horizontal axis H and contact-angle lines L1–L4 which are lines perpendicular to the central axis 0 of each barrel-shaped roller 4. As shown in FIG. 6(A), each roller 4 is configured such that it has a cylindrical-shaped central portion 4a and a pair of arc-shaped portions 4b, 4b which gradually decrease in their diameters from the central cylindrical portion 4a to the opposite ends thereof.

The roller-rolling surfaces 5, 6 are each of a single arc-shaped configuration having a radius of curvature slightly greater than that of the opposite side arc-shaped portions 4b, 4b of each roller 4, the arc-shaped configuration including a region which corresponds to the opposite side arc-shaped portions 4b, 4b of each roller 4 and which has a radius of curvature slightly greater than that of the opposite side arc-shaped portions 4b, 4b of each roller 4 so as to form concave-shaped arc surfaces 5b, 5b; 6b, 6b that cause differential slips upon contacting the opposite side arc-shaped portions 4b, 4b. In this embodiment, those regions of the roller-rolling surfaces 5, 6 which correspond to the central cylindrical portion 4a of each roller 4 are central arc surfaces 5a, 6a contiguous to the opposite side arc surfaces 5b, 5b; 6b, 6b.

As a result, when applied by a light load, each roller 4 is in contact at opposite ends of the central cylindrical portion thereof with the opposed roller-rolling surfaces 5, 6 at two points with slight spaces or gaps being formed between the central cylindrical portion 4a and the central arc surfaces 5a, 6a in confrontation therewith.

The opposite side arc-shaped portions 4b, 4b of each roller 4 are formed of arcs which have the same radius of curvature but different centers of curvature, or arcs which have the same centers of curvature and a radius of curvature slightly less than that of the roller-rolling surfaces 5, 6.

According to this embodiment, the area of contact of each roller with respect to the roller-rolling surfaces becomes great as compared with that of each ball, so the load-bearing capacity of the roller guiding apparatus increases.

In addition, when acted by a light load, the rollers 4 are in contact at the opposite ends of the central cylindrical portion 4a thereof with the roller-rolling surfaces 5, 6 at two points, respectively, so that they can rollingly travel smoothly and lightly. On the other hand, when loaded heavily such as during a cutting operation, the opposite side arc-shaped portions 4b, 4b of each roller 4 contact the opposite side arc-shaped portions 5b, 5b; 6b, 6b of the roller-rolling surfaces 5, 6 so that the rollers 4 are subjected to differential slips, thus enhancing the vibration-damping capability of the apparatus.

Although the sliding friction force of each roller 4 is proportional to the contact pressure of the corresponding roller-rolling surfaces 5, 6, the opposite side arc-shaped portions 4b, 4b of each roller 4 are high in the contact pressure even at the opposite ends thereof, and hence have great sliding friction forces.

Moreover, it is easy to fabricate and measure the central cylindrical portion 4a of each roller 4. That is, in cases where the height of the upper surface of the movable body 3 with respect to the traveling rail 2 is to be set within the range of predetermined dimensional tolerances, in general, the dimensions of various movable bodies 3 and rollers 4 are actually measured and graded on the basis of a traveling rail 2, and appropriate ones of them are combined so as to provide a movable body 3 with a prescribed height of the predetermined dimensional accuracy. If the central portion of a roller 4 is of an arc-shaped configuration, it will be difficult to accurately measure the outer diameter of the roller 4, but measurements can be made with ease when the central portion of a roller 4 is formed into a cylindrical shape, i.e., when a roller 4 has a central cylindrical portion 4a.

In addition, even where there arises displacements of the circulation paths, errors in parallelism of a mounting surface of the traveling rail 2 on which the movable body 3 is to be mounted, and/or distortions or deformations of components of the apparatus due to large loads or thermal deformations, the opposite side arc-shaped portions 4b, 4b of each roller 4 and the arc-shaped roller-rolling surfaces 5, 6 cooperate to make automatic adjustments so as to prevent non-uniform or one-sided contact of the rollers 4 with respect to the roller-rolling surfaces 5, 6, so that the rollers 4 can contact the roller-rolling surfaces 5, 6 uniformly or in a well-balanced posture to rollingly travel therealong in a smooth manner.

It is preferred that the radius of curvature R of the opposite side arc-shaped surfaces 5b, 5b; 6b, 6b of the roller-rolling surfaces 5, 6 be set to be equal to or greater than "R0×1.02" or therearound, i.e., $$R \geq R0 \times 1.02$$

where R0 is a radius of curvature of the opposite side arc-shaped portions 4b, 4b of each roller 4.

On the contrary, taking as a base or reference the radius of curvature R of the opposite side arc-shaped surfaces 5b, 5b; 6b, 6b of the roller-rolling surfaces 5, 8, it is preferred that the radius of curvature R0 of each barrel-shaped roller 4 be set to be in the range of about 0.95–0.99 times as large as the radius of curvature R of the roller-rolling surfaces 5, 6.

Next, other preferred embodiments of the present invention will be described below. In the following description, only those portions of the embodiments different from what has been described in the first embodiment will be referred to while omitting a description of the same or like structural portions which are identified at the same reference symbols.

FIG. 6(B) shows another roller-contacting structure in which a barrel-shaped roller is in contact with a pair of opposed roller-rolling surfaces in accordance with a second embodiment of the present invention. In this embodiment those portions of the roller-rolling surfaces 5, 6 which correspond to a central cylindrical portion 4a of the roller 4 are composed of flat or planar central linear portions 5c, 6c.

According to the second embodiment, the central cylindrical portion 4a of the roller 4 is in linear contact with the flat linear portions 5c, 6c of the roller-rolling surfaces 5, 6, and hence the area of contact therebetween becomes great, providing an increased load-bearing capacity.

Furthermore, when acted by a light load, the central cylindrical portion 4a of the roller 4 contacts the flat linear portions 5c, 6c of the roller-rolling surfaces 5, 6 and rollingly travels therealong in a light manner, whereas when acted by a heavy load such as during a cutting or machining operation, the opposite side arc-shaped portions 4b, 4b of the roller 4 come in contact with the opposite side arc-shaped portions 5b, 5b; 6b, 6b of the roller-rolling surfaces 5, 6 to thereby cause differential slips therebetween, which act to increase the vibration-damping capability of the apparatus.

FIG. 6(C) shows a further roller-contacting structure in accordance with a third embodiment of the present invention. In this embodiment, barrel-shaped roller 4 has a pair of opposite side arc-shaped portions 4b, 4b and a central portion which is formed into an arc surface contiguous to the arc-shaped portions 4b, 4b. Similarly, each of opposed roller-rolling surfaces 5, 6 has a pair of opposite side arc-shaped portions 5b, 5b; 6b. 6b and a central portion which is formed into a single arc surface contiguous to the opposite side arc-shaped portions 5b, 5b; 6b, 6b.

In the third embodiment, the points of contact of the opposed roller rolling surfaces 5, 6 with respect to each roller 4 when lightly loaded are bottoms or central portions of the roller-rolling surfaces 5, 6, whereas when subjected to a heavy load, the points or portions of contact expand from the respective bottoms or central arc portions of the roller-rolling surfaces 5, 6 toward the opposite side arc-shaped surfaces 5b, 5b: 6b, 6b, thereby generating differential slips and hence increasing the vibration-damping capability.

FIG. 6(D) shows a still further roller-contacting structure in accordance with a fourth embodiment of the present invention. In this embodiment, a barrel-shaped roller 4 has a central portion 4c composed of a central arc surface and a pair of opposite side arc-shaped portions 4b, 4b contiguous to the central arc surface 4c. A pair of opposed roller-rolling surfaces 5, 6 each have a central region 5c or 6c corresponding to the central arc surface 4c, and a pair of opposite side arc-shaped portions 5b, 5b or 6b, 6b, the central region 5c or 6c being composed of 4a central arc surface having a radius of curvature which is smaller than that of the opposite side arc-shaped portions 5b, 5b or 6b, 6b, but substantially equal to that of the central arc surface 4c of the roller 4.

With this construction, unlike the third embodiment shown in FIG. 6(C), even when loaded lightly, the central arc surface 4c of the roller 4 is in full surface contact with the central arc surfaces 5c, 6c of the opposed roller-rolling surfaces 5, 6 so that slight differential slips are created, thus generating a vibration-damping effect in case of a light load as well. Accordingly, this embodiment is effective when an appropriate vibration-damping capability is required even in case of a small operational load. For example, it is effective for machine tools in which vibrations are required to be reduced as much as possible.

In addition, when subjected to a great load, the opposite side arc-shaped portions 4b, 4b of the roller 4 come into full surface contact with the opposite side arc surfaces 5b, 5b; 6b, 6b, causing increased differential slips therebetween. As a result, a great vibration-damping property can be obtained.

Figure 7:
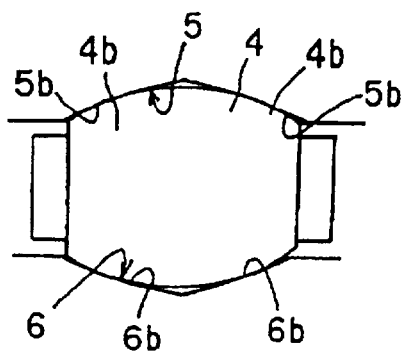
FIG. 7 is a cross-sectional view showing the condition of contact between a roller and a roller-rolling surface in accordance with a fifth embodiment of the present invention.

FIG. 7 shows a yet further roller-contacting structure in accordance with a fifth embodiment of the present invention. In this embodiment, the apparatus is constructed such that the opposite side arc-shaped portions 4b, 4b of a barrel-shaped roller 4 are in contact with the opposite side arc surfaces 5b, 5b; 6b, 6b of opposed roller-rolling surfaces 5, 6 at four points.

In this embodiment, each of the roller-rolling surfaces 5, 6 is composed of two arc surfaces 5b, 5b or 6b, 6b which have different centers of curvature from each other. The opposite side arc-shaped portions 4b, 4b of the roller 4 has a radius of curvature which is set to be slightly greater than that of the two opposite side arc surfaces 5b, 5b; 6b, 6b of the roller-rolling surfaces 5, 6.

In this embodiment, too, it is preferred that the radius of curvature R of each of the opposite side arc-shaped surfaces 5b, 5b; 6b, 6b of the roller-rolling surfaces 5, 6 be set to be equal to or greater than "R0×1.02" or therearound, i.e., $$R \geq R0 \times 1.02$$

where R0 is a radius of curvature of the opposite side arc-shaped portions 4b, 4b of each roller 4. Also, taking as a base or reference the radius of curvature R of each of the opposite side arc-shaped surfaces 5b, 5b; 6b, 6b of the roller-rolling surfaces 5, 6, it is preferable that the radius of curvature R0 of each roller 4 be set to be in the range of about 0.95–0.99 times as large as the radius of curvature R of the opposite side arc-shaped surfaces 5b, 5b; 6b, 6b of the roller-rolling surfaces 5, 6.

Since those portions of each roller 4 which contact each of the roller-rolling surfaces 5, 6 are two, i.e., they exist in the opposite side arc-shaped portions 4b, 4b separated from each other by the central portion, the load-bearing capacity of this embodiment is greater than when each roller 4 has a single contact portion alone.

Moreover, the points of contact in case of a light load exist in the center of each of the opposite side arc surfaces 5b,5b; 6b, 6b of the barrel-shaped roller-rolling surfaces 5, 6, and when subjected to a heavy load, the surfaces of contact expand from the center of each of the two arc surfaces 5b, 5b; 6b, 6b of the barrel-shaped roller-rolling surfaces 5, 6, transversely or widthwise of each roller 4. Consequently, the load-bearing capacity of the apparatus is increased, and the vibration-damping capability thereof is improved due to differential slips.

While the invention has been described in terms of a few preferred embodiments, those skilled in the art will recognize that the invention can be practiced with modification within the spirit and scope of the appended claims.

What is claimed is:

1. A roller guiding apparatus comprising:
   an elongated traveling rail having a roller-rolling surface formed thereon;
   a movable body having a roller-rolling surface formed in opposition to the roller-rolling surface of said traveling rail; and
   a multitude of rollers interposed between the opposed roller-rolling surfaces of said traveling rail and said movable body;
   wherein said rollers are each formed with a pair of arc-shaped portions having a diameter gradually decreasing from a central portion thereof toward opposite ends thereof, and wherein each of said roller-rolling surfaces has a pair of first regions corresponding to said arc-shaped portions of each of said rollers, said first regions being each formed into an arc surface having a radius of curvature slightly greater than that of a corresponding arc surface of each roller such that each roller can be in contact at its opposite side arc surfaces with the corresponding arc surfaces of said opposed roller-rolling surfaces to thereby cause a differential slip therebetween.

2. The roller guiding apparatus according to claim 1, wherein the central portion of each of said rollers comprises a central cylindrical portion of a cylindrical configuration.

3. The roller guiding apparatus according to claim 2, wherein each of said roller-rolling surfaces has a second region corresponding to said central cylindrical portion of each roller, said second region comprising an arc-shaped surface contiguous to said opposite side arc surfaces of each roller-rolling surface.

4. The roller guiding apparatus according to claim 2, wherein each of said roller-rolling surfaces has a second region corresponding to said central cylindrical portion of each roller, and said second region of each of said roller-rolling surfaces comprises a flat linear portion.

5. The roller guiding apparatus according to claim 1, wherein the central portion of each of said rollers comprises a central arc-shaped portion.

6. The roller guiding apparatus according to claim 5, wherein each of said roller-rolling surfaces has a second region which corresponds to the central arc-shaped portion of each roller and which has a radius of curvature slightly greater than that of the central arc-shaped portion of each roller.

7. The roller guiding apparatus according to claim 5, wherein each of said roller-rolling surfaces has a second region which corresponds to the central arc-shaped portion of each roller and which has a radius of curvature substantially equal to that of the central arc-shaped portion of each roller.

8. The roller guiding apparatus according to claim 1, wherein each of said opposed roller-rolling surfaces consists of a pair of opposite side arc surfaces so that each roller is in contact at its opposite side arc-shaped portions with the opposite side arc surfaces of said roller-rolling surfaces at four points.

9. The roller guiding apparatus according to claim 1, wherein said respective rollers on said traveling rail at an upper and opposite sides thereof are held in place and connected with each other by means of corresponding roller connectors, respectively.

* * * * *